(12) United States Patent
Köster et al.

(10) Patent No.: US 9,914,237 B2
(45) Date of Patent: Mar. 13, 2018

(54) APPARATUS FOR SLICING FOOD PRODUCTS

(71) Applicant: Weber Maschinenbau GmbH Breidenbach, Breidenbach (DE)

(72) Inventors: Bernd Köster, Abbenrock (DE); Jörg Stremel, Bad Laasphe (DE); Alexander Burk, Dautphetal (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 223 days.

(21) Appl. No.: 14/855,481

(22) Filed: Sep. 16, 2015

(65) Prior Publication Data

US 2016/0075048 A1 Mar. 17, 2016

(30) Foreign Application Priority Data

Sep. 17, 2014 (DE) .......................... 10 2014 113 424

(51) Int. Cl.
*B26D 7/27* (2006.01)
*G21K 5/08* (2006.01)
(Continued)

(52) U.S. Cl.
CPC ............... *B26D 7/27* (2013.01); *B26D 5/007* (2013.01); *B26D 7/30* (2013.01); *G01J 1/42* (2013.01); *G21K 5/08* (2013.01); *B26D 2210/02* (2013.01)

(58) Field of Classification Search
CPC ........... B26D 7/32; G21K 5/08; G01B 11/024
See application file for complete search history.

(56) References Cited

U.S. PATENT DOCUMENTS

2004/0194605 A1 10/2004 Weber
2004/0200365 A1 10/2004 Young
(Continued)

FOREIGN PATENT DOCUMENTS

DE 10131701 A1 1/2003
DE 10136809 A1 2/2003
(Continued)

*Primary Examiner* — Tony Ko
(74) *Attorney, Agent, or Firm* — Wiggin and Dana LLP; Gregory Rosenblatt; Matthew Burton

(57) ABSTRACT

An apparatus for slicing food products, in particular a high-performance slicer, comprises a product feed which defines a feed plane and by means of which the products are fed along the feed plane in a feed direction to a cutting plane which is disposed in a slicing region and in which a cutting blade moves, in particular in a rotating and/or revolving manner, said cutting blade cooperating with a cutting edge which in particular extends in parallel with the feed plane and perpendicular to the feed direction to cut off slices from the products. The cutting apparatus additionally comprises a detection device for radiation reflected from the slicing region and an evaluation device for evaluating the detected radiation and an illumination device for illuminating the slicing region which is arranged for the at least substantially frontal illumination of the product end face in the half-space disposed in front of the slicing region and above the feed plane and comprises at least one radiation source ad well as a diaphragm arrangement associated therewith which defines a plurality of elongate illumination radiation paths which are optically separate from one another, which each extend in the direction of the slicing region and which are arranged adjacent to one another.

21 Claims, 3 Drawing Sheets

(51) Int. Cl.
   *G01J 1/42*    (2006.01)
   *B26D 5/00*    (2006.01)
   *B26D 7/30*    (2006.01)

(56) References Cited

U.S. PATENT DOCUMENTS

2005/0120844 A1    6/2005   Weber
2016/0271822 A1*   9/2016   Burk ........................ B26D 5/00

FOREIGN PATENT DOCUMENTS

| DE | 10147617 A1 | 4/2003 |
| EP | 1152873 81 | 9/2002 |
| EP | 1429898 B1 | 5/2005 |
| WO | 2003004228 A1 | 1/2003 |
| WO | 2007148041 A1 | 12/2007 |

* cited by examiner

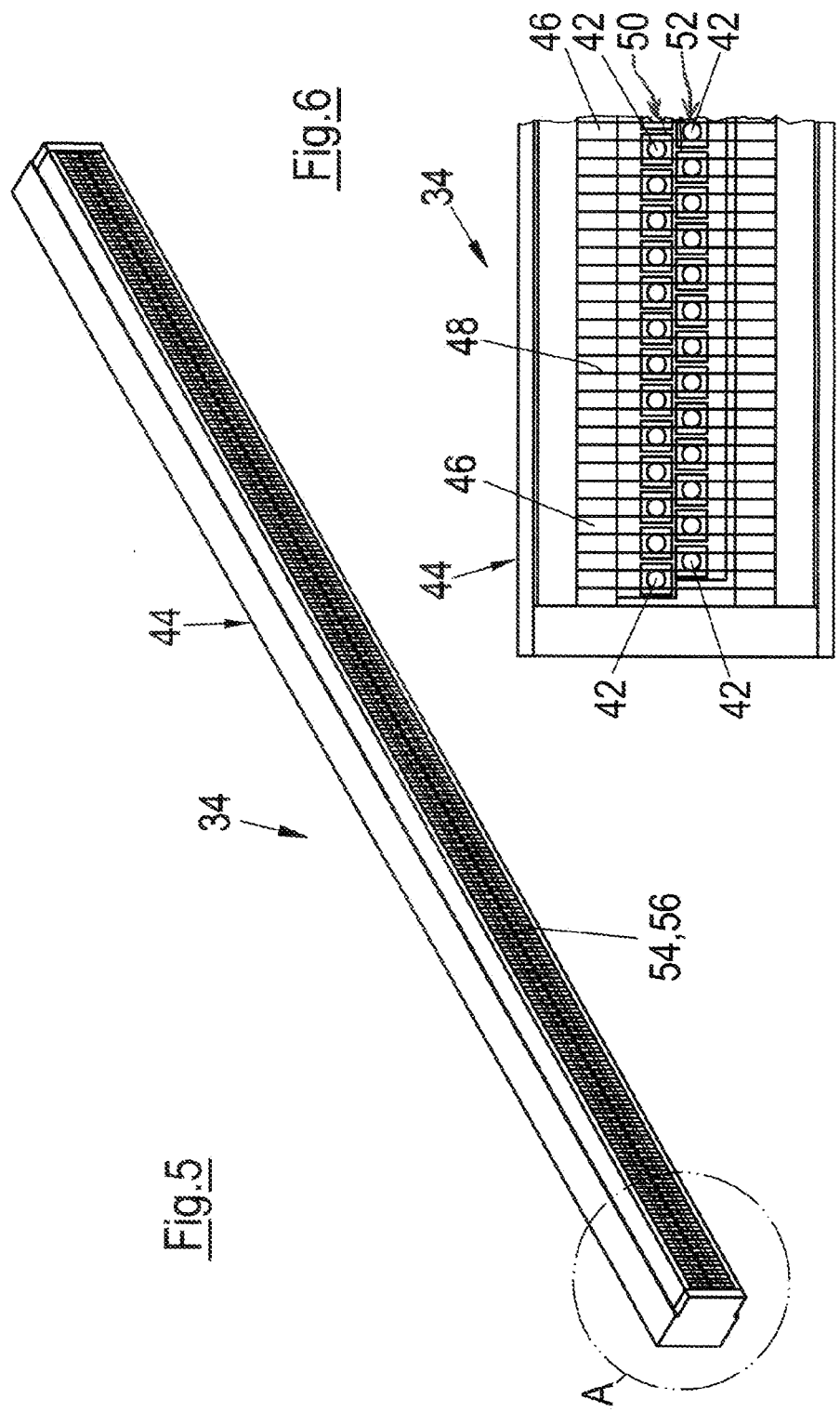

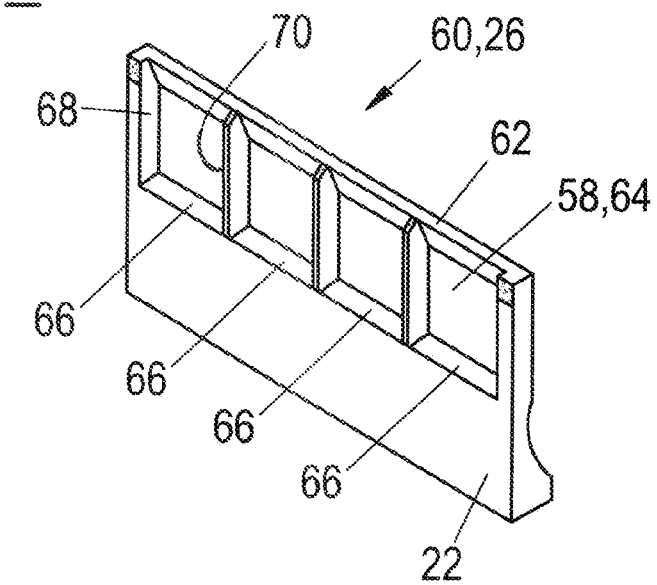
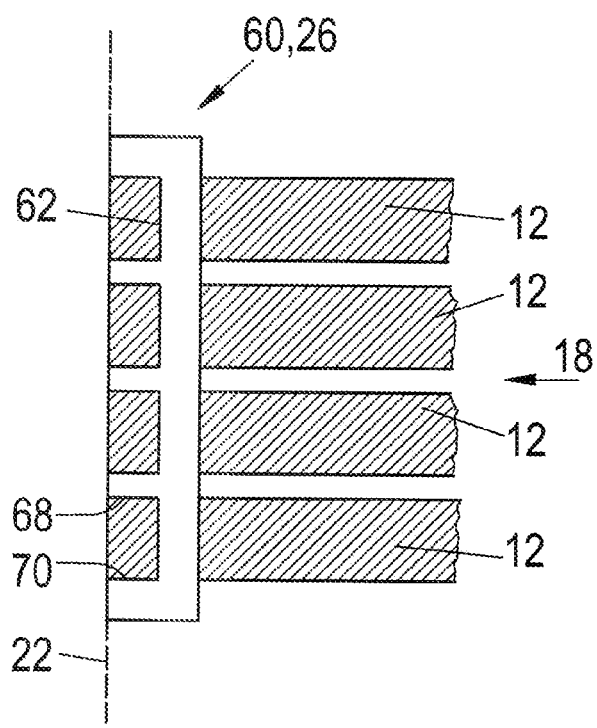

APPARATUS FOR SLICING FOOD PRODUCTS

CROSS-REFERENCE TO RELATED APPLICATION

The present patent application claims the benefit of prior filed German Patent Application No. 10 2014 113 424.9, filed on Sep. 17, 2014, the contents of which are incorporated herein by reference in their entirety.

FIELD OF THE INVENTION

The invention relates to an apparatus for slicing food products, in particular to a high-performance slicer, having a product feed which defines a feed plane and by means of which the products are fed along the feed plane in a feed direction to a cutting plane which is disposed in a slicing region and in which a cutting blade moves, in particular in a rotating and/or revolving manner, said cutting blade cooperating with a cutting edge which in particular extends in parallel with the feed plane and perpendicular to the feed direction to cut off slices from the products.

BACKGROUND OF THE INVENTION

Such apparatus are generally known. In this respect, so-called optical scales are frequently also used with such apparatus and comprise at least one camera which is attached in front of the cutting compartment and which acquires the cross-sectional surface of a product which is visible from the front in the product compartment. The product cross-section appears light and the environment or hollow spaces in the product appear dark. A good contrast is important for the acquisition quality in this respect. A signal to the slicer control is generated by the evaluation of the images. The classification of the number of slices and of the slice thickness can thus be carried out or corrected in accordance with the recognized holes in a loaf of cheese, for example, to achieve the desired weight of a portion. An image of the end face of the product is thus generated and indeed in a narrow time window in which the cutting surface is completely freely visible. This is a point in time in this respect at which the cutting blade is still just located outside the cutting surface and the previously cut off slice is completely placed down. To avoid total reflections such as white spots, which would prevent an image evaluation, it was previously avoided to illuminate the product cross-sectional surface from the end face.

It has also already been proposed to illuminate as much of the total region of the cutting surface as possible from below with sidelight by means of a lamp inserted in the optical scales. The installation position of the lamp provided for this purpose, however, frequently causes technical application problems and disadvantages in operation. A specific gap is thus required between the portioning belt and the cutting edge for a secure light passage from below, for which purpose the portioning belt has to be arranged relatively low. However, this now brings about a relatively large drop height which is disadvantageous for the placing down. In addition, on a lighting from below, the cast shadow of the falling slices has to be observed since this has a substantial influence on the time window available for a shot. Furthermore, a cast shadow can arise in the sidelight due to a so-called projection formation at the lower side of the product, that is in the region of the contact at the cutting edge. In this respect, a shadow falls in the above-disposed surface regions, which can make the evaluation substantially more difficult.

SUMMARY OF THE INVENTION

It is thus the underlying object of the invention to provide an apparatus of the initially named kind in which the previously mentioned problems are eliminated. In this respect, an illumination of the product cross-sectional surface should be achieved which is as uniform or as homogenous as possible while avoiding total reflections.

The object is satisfied in accordance with the invention by an apparatus for slicing food products having the features of claim 1. Preferred embodiments are set forth in the dependent claims.

The apparatus in accordance with the invention for slicing food products, in particular a high-performance slicer, comprises a product feed which defines a feed plane and by means of which the products are fed along the feed plane in a feed direction to a cutting plane which is disposed in a slicing region and in which the cutting blade moves, in particular in a rotating and/or revolving manner, said cutting blade cooperating with a cutting edge which in particular extends in parallel with the feed plane and perpendicular to the feed direction to cut off slices from the products. The apparatus additionally comprises a detection device for radiation reflected from the slicing region and an evaluation device for evaluating detected radiation as well as an illumination device for illuminating the slicing region which is arranged for the at least substantially frontal illumination of the product end face in the half-space disposed in front of the slicing region and above the feed plane and comprises at least one radiation source as well as a diaphragm arrangement associated therewith which defines a plurality of elongate illumination radiation paths which are optically separate from one another, which each extend in the direction of the slicing region and which are arranged adjacent to one another.

An extremely uniform or homogenous illumination of the product end face is achieved on the basis of this configuration while avoiding the total reflections which previously arose, which in particular has a positive effect on the cutting quality and portion quality as well as on the productivity over the total plant over the product throughput. The same brightness is now achieved at every point of the cutting plane since the previously customary overlap of adjacent radiation sources is avoided there. The working speed of the detection device, which in particular comprises a camera system, as well as of the evaluation device is considerably increased. Smaller time windows are sufficient for illuminating the slicing region so that higher cutting blade speeds and/or wider cutting compartments are in particular made possible. Different technical application problems with respect to robustness, precision and handling capability of the cutting apparatus or of the high-performance slicer are thus overcome.

The diaphragm arrangement preferably defines at least a number of illumination radiation paths following one another in a direction in parallel with the cutting edge or with the cutting plane.

At least one radiation source can in particular respectively be associated with the respective illumination radiation paths. It is therefore also in particular conceivable to associate a respective plurality of radiation sources with at least some illumination radiation paths.

Provision can furthermore be made that an optics bundling the beams is associated with each radiation source or with at least a plurality of radiation sources.

In accordance with a preferred practical embodiment of the apparatus in accordance with the invention, the diaphragm arrangement is formed as a front attachment of the radiation source extending from the radiation source in the direction of the slicing region.

The illumination radiation paths can, for example, each have a length of some centimeters measured in the direction of their longitudinal extent. In this respect, their length can, for example, lie in the range of 4 cm or can also be a little smaller. The height of the illumination radiation path can, for example, be dimensioned approximately like its length. However, other dimensions of these illumination radiation paths are generally also conceivable.

In accordance with an expedient practical embodiment of the apparatus in accordance with the invention, the diaphragm arrangement for propagating the radiation has a plurality of light compartments and/or illumination elements facing the slicing region. Such embodiments are in particular also conceivable in which the illumination radiation paths for propagating the radiation in the direction of the slicing region comprise a gas, in particular environmental air, or a solid or liquid light-conducting and/or light permeable material, in particular glass or plastic. It is in particular of advantage in the case that light compartments are formed if the diaphragm arrangement comprises light impermeable dividing walls, in particular slat-like dividing walls, and if the illumination radiation paths are optically separated from one another by these dividing walls.

An alternating arrangement of illumination radiation paths and, optionally, dividing walls thus results, wherein a respective compartment or light path can be created for the light directing in the irradiation direction. One or also more light sources can be associated with a respective compartment or path.

If dividing walls are provided, the diaphragm arrangement expediently comprises at least one transverse web which engages over the dividing walls at the marginal side and by which the dividing walls are fixed at a defined spacing relative to one another. In this respect, the transverse web and/or the dividing walls can, for example, be provided at the marginal side with slits via which the transverse web and the dividing walls can be plugged together.

Alternatively, the diaphragm arrangement can, for example, also comprise at least one connection member, in particular a rope guided in the apertures of the dividing walls at the marginal side or a bar engaging through the dividing walls at the marginal side, onto which the spacers insertable between the dividing walls can be threaded or strung.

Such embodiments are advantageously also conceivable in which the dividing walls of the diaphragm arrangement are provided with molded spacers by which the dividing walls are held at a defined spacing relative to one another.

At least one transverse web can therefore engage over the dividing walls, for example, and fix them at a longitudinal side. Tongues which ensure the spacing can be provided at the transverse web, for example at the side facing the compartments, and in particular engage into the intermediate spaces between two respective dividing walls. The transverse web can be slit a little from the margin for this purpose, for example. In a complementary manner, the dividing walls can also be slit a little from the upper side to allow the transverse web to engage slightly and also to fix the dividing walls in the irradiation direction. The transverse web can itself, for example, be fastened to the housing of the diaphragm arrangement or can be fastened via a carrier element in the region of a radiation source mount. At least one rope guided in apertures of the dividing walls at the marginal side can be tensioned in the end regions. At least one bar engaging through the dividing walls at the marginal side can also have a clamping apparatus such as a thread in at least one end region.

Dividing walls provided with molded spacers can have an angled marginal region, for example.

In accordance with a further advantageous embodiment of the apparatus in accordance with the invention, the illumination radiation paths are formed by a plurality of elements strung with one another, in particular of plate shape and formed from light conducting and/or light permeable material, the element being mechanically fixed to one another and being optically separated from one another by at least one light impermeable coating.

A construction of coated, thin, transparent plates of glass or plexiglass is therefore conceivable, for example. In this respect, the plates can in particular be provided with a light-tight coating at one side. The plates strung with one another or fixed, for example adhesively bonded, to one another can then form a rod which, for example, represents a diaphragm for a row of radiation sources attached to one of the long sides, which diaphragm delivers the desired reflection-free light structure at the outlet side. The illumination radiation paths are therefore no longer formed by compartments in the present case, but rather by, for example, plate-shaped elements of light conducting and/or light permeable material, the elements being optically separated from one another by at least one light impermeable coating.

The radiation sources preferably respectively comprise at least one light-emitting diode. Such embodiments are in particular also conceivable in which one or more mutually parallel strips of a respective plurality of radiation sources, in particular light-emitting diodes, are provided which follow one another in a direction in parallel with the cutting edge or with the cutting plane, wherein a respective one or more radiation sources or light-emitting diodes are associated with the illumination radiation paths. The luminance can thus, for example, also be reduced uniformly over the length of the illumination device extending in parallel with the cutting edge if a strip is switched off or dimmed. The use of different colors and/or the utilization of a row with stroboscopic flash effects is also conceivable, for example. In the latter case, different images can be taken after one another can be superposed on one another. However, such embodiments are also conceivable, for example, in which light exiting at the ends of optical fibers or a continuous glowstick are used for forming the radiation sources.

It is in particular also of advantage if the illumination device is designed as a uniform block which is provided with a transparent cover at its end face facing the slicing region.

The total illumination device can, for example, therefore be configured as a, for example, encapsulated block, wherein the light discharge takes place via a transparent cover at the end face of the diaphragm arrangement facing the slicing region to be illuminated. A reliable protection against dirt, splash water and mechanical influences is thus achieved. In addition, an integration of the illumination device in an associated housing of the detection device in particular comprising a camera is also conceivable.

It is also in particular of advantage if radiation sources associated with different illumination radiation paths are individually controllable and/or are individually variably adjustable, in particular at least with respect to their light properties and/or light intensities.

A light structure, in particular a strip pattern, can preferably be generated on the produce end face to be illuminated by means of the illumination device. In this respect, it is possible to be able to generate the light structure at least in part by a corresponding control and/or setting of radiation sources associated with different illumination radiation paths.

In accordance with an expedient practical embodiment of the apparatus in accordance with the invention, the light structure is at least i generated by a diaphragm and/or by markings which are in particular linear and which are applied to a transparent cover provided at the end face of the illumination device facing the slicing region or are introduced into such a transparent cover.

A specific light structure can therefore be generated, for example, in that the radiation sources are controlled in segments of the diaphragm arrangement with a special control pattern. Individual radiation sources or groups of radiation sources can therefore e.g. have different light properties and/or light intensities alternatingly over the width of the illumination device. The luminous power is thus, for example, individually adjustable for each illumination segment, with adjacent illumination segments shining with different brightnesses, for example. A light structure such as a strip pattern can thus be generated with which the upper edge of a product or hollow spaces in a product can in particular be detected. In this respect, the refractive effect of the light structure at edges which bound the cutting area is utilized. In addition to the possibility of generating a linear pattern via a suitable control pattern in order to recognize geometrical properties such as edges in the otherwise planar cutting area, the far-reaching possibility is inter alia also provided of working with different light frequencies for the detection of quality features.

A combined use of different light frequencies in conjunction with multispectral filters and suitable taking sensors is thus conceivable, for example, which are known in the form of Bayer filters for CCD cameras or of mosaic filters having four frequencies (RGB+NIR).

A use is also in particular conceivable with, for example, four to five light frequencies, for example with the RBG colors and frequencies from the infrared absorption spectrum of plastics at in particular approximately 1700 nm or of water at in particular approximately 1450 nm. Inclusions of foreign bodies of plastic or inclusions of low-water foreign bodies can then be detected, for example, in a food product such as sausage, cheese or ham on the basis of the deviation from the behavior of the base material using a suitable high resolution taking sensor such as a CMOS camera which is light sensitive in the visible range up to and into the NIR range up to 1800 nm. The uniform or homogeneous illumination of the product cross-sectional surface also brings along substantial advantages in this connection due to the solution in accordance with the invention. The extremely disturbing influence of intensity fluctuations which previously arose due to irregular illumination is thus avoided.

In addition, strip patterns, in particular also with a diaphragm or with lines, can be generated which are in particular applied to or introduced into the transparent cover on the end face of the illumination device facing the slicing region.

An additional illumination by laser radiation from above can also be provided to carve out the product margins on the upper product side more clearly. This is of advantage since the luminance is maintained independently of the spacing from the product to be illuminated on the use of a laser.

It must be noted in this respect that the attachment position of the lasers precludes a contamination. The attachment of the lasers therefore expediently takes place in the region of the cutting blade head and thus as closely as possible behind the rear side of the cutting blade.

In this respect, in particular at least three laser light sources can be used in a laterally slightly offset position. A packet of angled laser beams is expediently generated in order to achieve an illumination of the total cutting compartment width directly from above, from the center about the cutting blade head.

To illuminate the front product edge from above with the laser light, the cutting edge or the molded tray can have a little cut-out from the upper side. For this purpose, in particular its upper margin can be set back a little, for example by some few millimeters, from the cutting plane in the region of a respective product passage opening so that the product is only led up to the cutting plane or front side from below and at the sides. This is sufficient as a rule in connection with the support and contact of the product for clean cuts.

BRIEF DESCRIPTION OF THE DRAWINGS

The invention will be explained in more detail in the following with reference to embodiments and to the drawing; there are shown in this:

FIG. 5 a perspective view of a further exemplary embodiment of the illumination device of the apparatus in accordance with FIG. 1;

FIG. 6 an enlarged representation of the part region A of the illumination device in accordance with FIG. 5;

FIG. 7 a perspective representation of an exemplary embodiment of a molded tray of the apparatus in accordance with FIG. 1; and FIG. 8 a schematic plan view of the molded tray in accordance with FIG. 7.

DETAILED DESCRIPTION

Figure 1:
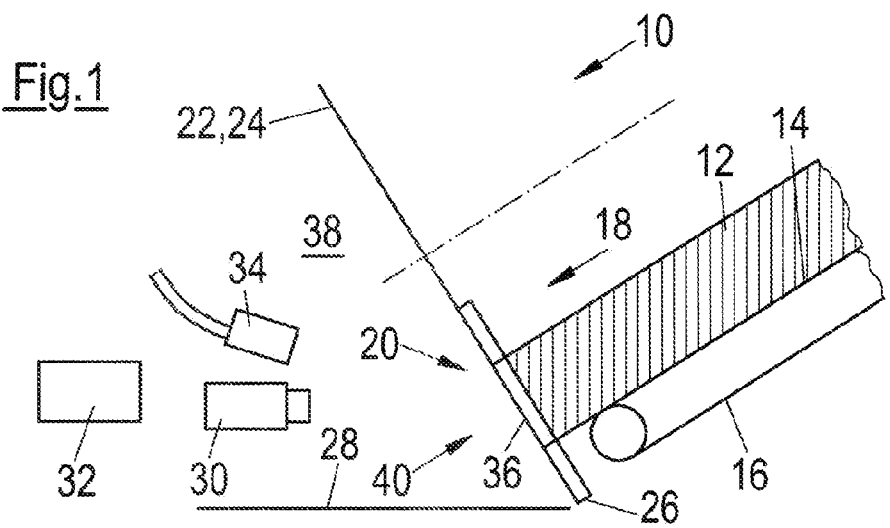
FIG. 1 a schematic part representation of an exemplary embodiment of an apparatus in accordance with the invention for slicing food products.

FIG. 1 shows in a schematic part representation an exemplary embodiment of an apparatus 10 in accordance with the invention for slicing food products 12 (cf. also FIG. 2), which can in particular be a high-performance slicer.

The cutting apparatus 10 comprises a product feed 16 which defines a feed plane 14 and by means of which the products 12 are fed along the feed plane 14 in a feed direction 18 to a cutting plane 22 disposed in a slicing region 20. A cutting blade 24 moves in the cutting plane 22, in particular in a rotating and/or revolving manner, said cutting blade cooperating with a cutting edge 26 which in particular extends in parallel with the feed plane 14 and perpendicular to the feed direction 18 for cutting off slices from the products 12. A portioning belt 28 or the like can, for example, be provided in the half-space 38 disposed in front of the slicing region 20 for the transporting away of the cut-off slices.

The cutting apparatus 10 moreover comprises a detection device 30 for radiation reflected from the slicing region 20, an evaluation device 32 for evaluating the detected radiation and an illumination device 34 for illuminating the slicing region 20. The detection device 30 can in particular comprise at least one camera.

The illumination device 34 is arranged in the half-space 38 disposed in front of the slicing region 20 and above the feed plane 14 for the at least substantially frontal illumination of the front product end face 36.

Figure 2:
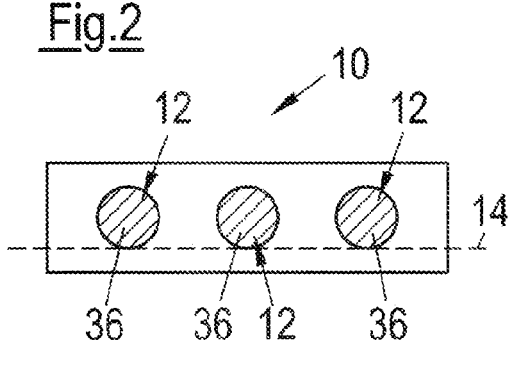
FIG. 2 a frontal view of the slicing region of the apparatus in accordance with FIG. 1 in the direction of the arrow 40 in FIG. 1.

FIG. 2 shows in a frontal view the slicing region 20 of the cutting apparatus 10 in accordance with FIG. 1 in the direction of the arrow 40 in FIG. 1. In this respect, for example, three food products 12 can be recognized which can be fed to the cutting plane 22 in a mutually parallel alignment. In addition, however, a plurality of or fewer products 12 can also be simultaneously fed to the cutting plane 22. The product end faces 36 can in particular also be recognized in this FIG. 2.

Figure 4:
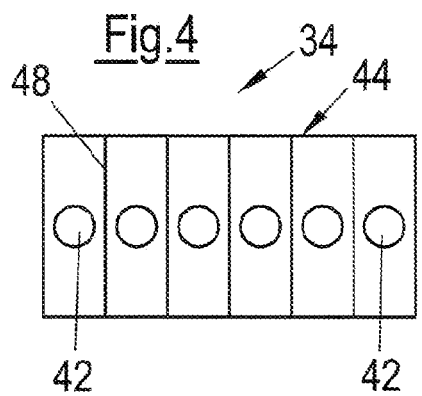
FIG. 4 a schematic cross-sectional representation of the illumination device in accordance with FIG. 3, cut along the line I-I in FIG. 3.
Figure 3:
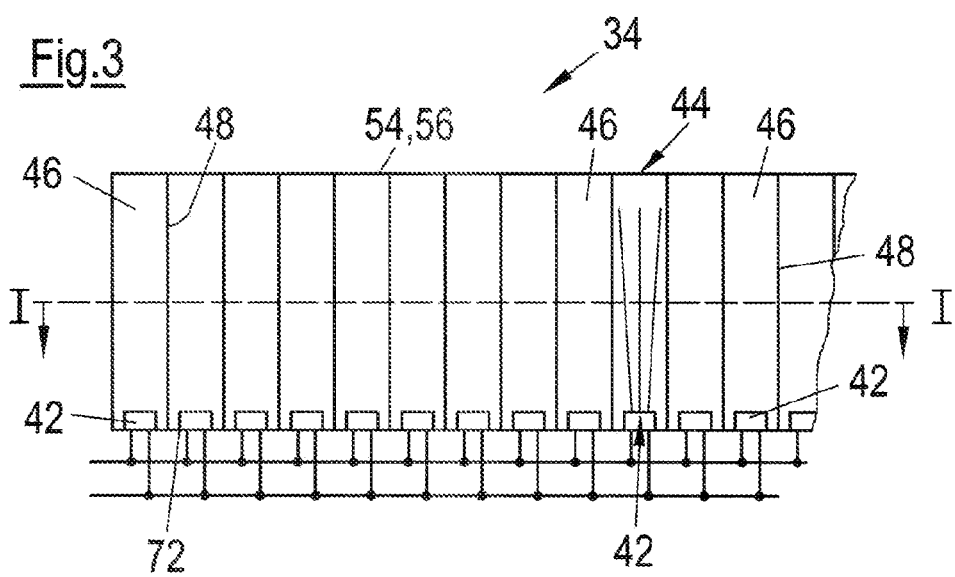
FIG. 3 a schematic plan view of a part of an exemplary embodiment of the illumination device of the apparatus in accordance with FIG. 1.

As can in particular be seen from FIGS. 3, 4, and 6, the illumination device 34 comprises a number of radiation sources 42 as well as a diaphragm arrangement 44 associated therewith. The diaphragm arrangement 44 defines a plurality of elongate illumination radiation paths 46 which are optically separate from one another and which each extend in the direction of the slicing region 20 and are arranged mutually adjacent to one another. As can best be seen with reference to FIGS. 3 and 6, the diaphragm arrangement 44 defines a series of illumination radiation paths 46 following one another in a direction in parallel with the cutting edge 26. In this respect, in the present case, one radiation source 42 is associated with each illumination radiation path, for example. Generally, however, such embodiments are also conceivable in which a respective plurality of radiation sources 42 are associated with at least some illumination radiation paths 46. The radiation sources 46 are, as shown, expediently positioned in the region of the rear side of the diaphragm arrangement 44 disposed opposite the end face 54 facing the slicing region 20 to be illuminated. In the present case, the radiation sources 42 are connected in parallel with one another, for example.

The cutting apparatus 10 is thus provided with optical scales comprising the illumination device 34, the detection device 30 and the evaluation device 32.

The diaphragm arrangement 44 is configured as a front attachment of the radiation sources 42 extending from the radiation sources 42 in the direction of the slicing region 20. In this respect, the illumination radiation paths 42 have a respective length of in particular some centimeters in the direction of the slicing region 20. This length can, for example, lie in the region of 4 cm or also be smaller. The height of the illumination radiation paths 46 can lie in the range of their length.

The diaphragm arrangement 44 can—as mentioned in the introduction part—in particular have a plurality of light compartments and/or illumination elements facing the slicing region 20 for propagating the radiation.

In particular in the case that the diaphragm arrangement 44 is provided with a plurality of light compartments, it can comprise light impermeable, in particular slat-like dividing walls 48 in order to optically separate the illumination radiation paths from one another. In this respect, the diaphragm arrangement 44 can in particular comprise at least one transverse web which engages over the dividing walls 48 at the marginal side and by which the dividing walls 48 are fixed at a defined spacing relative to one another. The transverse web and/or the dividing walls 48 can in this respect in particular be provided with slits at the marginal side via which the transverse web and the dividing walls 48 can be plugged together.

The diaphragm arrangement 44 can, however, for example, also comprise at least one connection member, in particular a rope guided in apertures of the dividing walls 48 at the marginal side or a bar engaging through the dividing walls 48 at the marginal side, onto which the spacer insertable between the dividing walls 48 can be threaded or strung. Alternatively, the dividing walls 48 can, however, for example also be provided with molded spacers by which the dividing walls 48 are held at a defined spacing relative to one another.

Alternatively, the illumination radiation paths 46 can in particular also be formed by a plurality of elements which are strung with one another, which are in particular of plate shape, which are formed form light conducting and/or light permeable material, which are mechanically fixed to one another and which are optically separated from one another by at least one light impermeable coating. In this case, the illumination radiation paths 46 are therefore formed by light conducting or light permeable plate-like elements instead of by light compartments.

As shown, the radiation sources 42 can each comprise at least one light-emitting diode. Whereas in the present case a respective only one radiation source 42 or light-emitting diode is associated with the illumination radiation paths 46, such embodiments are generally also conceivable in which a respective plurality of radiation sources 42 or light-emitting diodes are also associated at least in part with the illumination radiation paths 46. For example, one or more mutually parallel strips 50, 52 of a respective plurality of radiation sources 42 or light-emitting diodes which follow one another in a direction in parallel with the cutting edge 26 can also be provided (cf. FIG. 6). In this respect, a respective radiation source 42 or light emitting diode is alternately associated, for example, with the illumination radiation paths 46 in the representation in accordance with FIG. 6. In the present case, for example, two parallel strips 50. 52 of a respective plurality of radiation sources 42 or light-emitting diodes are provided. As already mentioned, a respective plurality of radiation sources 42 or light-emitting diodes can also at least partly be associated with the illumination radiation paths 46.

As can best be recognized with reference to FIG. 5, the illumination device 34 can in particular be configured as a uniform block which can be provided with a transparent cover 56 at its end face 54 facing the slicing region 20 to be illuminated.

Radiation sources associated with different illumination radiation paths 46 can in particular also be individually controllable and/or individually variably adjustable, in particular at least with respect to their light properties and/or light intensities, via a control device which can be integrated into the evaluation device 32 or which can also be provided separately therefrom.

Such embodiments are in particular also conceivable in which a light structure, in particular a strip structure, can be generated on the product end face 36 to be illuminated by means of the illumination device, as likewise already explained.

An additional illumination by laser radiation from above can be provided to carve out the product margins on the upper product side more clearly. This is of advantage since the luminance is maintained independently of the spacing from the product 12 to be illuminated on the use of lasers. Care must in particular be taken in this respect that the connection position of the lasers precludes a contamination. Its attachment in the region of the cutting blade head and thus as closely as possible behind the rear side of the cutting blade 24 is therefore of advantage.

In this respect, a plurality of laser light sources, in particular at least three laser light sources, can be used in a laterally slightly offset position.

To illuminate the product conveying edge from above by the laser light, the cutting edge 26 or the molded tray 60 (cf. FIGS. 7 and 8) can be cut out a little from the upper side. For this purpose, its upper margin 62 is set back a little, in particular some few millimeters, from the cutting plane 22 in the region of a respective product passage opening 64 so that a respective product 12 is only guided at the bottom and at the sides up to the cutting plane 22 or the front side. This is sufficient as a rule in connection with the support and contact of the products 12 for clean cuts. In the representation in accordance with FIGS. 7 and 8, four products 12 are, for example, simultaneously fed to the cutting plane 22 in a mutually parallel arrangement. The molded tray 60 correspondingly comprises four cutting compartments 58 or product passage openings 64 in the present case. In this respect, the products 12 are respectively supported at a lower support surface 66 and two mutually oppositely disposed sides 68, 70 of a respective cutting compartment 58 or product passage opening 64.

REFERENCE NUMERAL LIST

10 apparatus for slicing food products
12 food product
14 feed plane
16 product feed
18 feed direction
20 slicing region
22 cutting plane
24 cutting blade
26 cutting edge
28 portioning belt
30 detection device
32 evaluation device
34 illumination device
36 product end face
38 half-space
40 arrow
42 radiation source
44 diaphragm arrangement
46 illumination radiation path
48 dividing wall
50 strip
52 strip
54 end face
56 cover
58 cutting compartment
60 molded tray
62 upper margin
64 product passage opening
66 lower support surface
68 side
70 side

What is claimed is:

1. An apparatus for slicing food products,
having a product feed which defines a feed plane and by means of which the products are fed along the feed plane in a feed direction to a cutting plane which is disposed in a slicing region and in which a cutting blade moves, said cutting blade cooperating with a cutting edge to cut off slices from the products;
having a detection device for radiation reflected from the slicing region and having an evaluation device for evaluating the detected radiation; and
having an illumination device for illuminating the slicing region, said illumination device being arranged in a half-space disposed in front of the slicing region and above the feed plane for an at least substantially frontal illumination of a product end face and having a plurality of radiation sources and an associated diaphragm structure which defines a plurality of elongate illumination radiation paths which are optically separate from one another, which each extend in the direction of the slicing region and which are arranged adjacent to one another.

2. The apparatus in accordance with claim 1,
wherein the diaphragm structure defines at least a number of illumination radiation paths following one another in a direction in parallel with the cutting edge or with the cutting plane.

3. The apparatus in accordance with claim 1,
wherein at least one of the plurality of radiation sources is associated with each illumination radiation path.

4. The apparatus in accordance with claim 1,
wherein the diaphragm structure is configured as a front attachment of the radiation source extending from the radiation source in the direction of the slicing region.

5. The apparatus in accordance with claim 1,
wherein the diaphragm structure has a plurality of light compartments and/or illumination elements for propagating the radiation; and wherein the illumination radiation paths comprise a gas or a solid or liquid light-conducting and/or light permeable material for propagating the radiation in the direction of the slicing region.

6. The apparatus in accordance with claim 1,
wherein the diaphragm structure comprises light impermeable dividing walls and the illumination radiation paths are optically separated from one another by these dividing walls.

7. The apparatus in accordance with claim 6,
wherein the diaphragm structure engages over the dividing walls at the marginal side and by which the dividing walls are fixed at a defined spacing relative to one another.

8. The apparatus in accordance with claim 7,
wherein the diaphragm structure comprises at least one transverse web which engages over the dividing walls at the marginal side and by which the dividing walls are fixed at a defined spacing relative to one another.

9. The apparatus in accordance with claim 8,
wherein the transverse web and/or the dividing walls is or are provided with slits at the marginal side via which the transverse web and the dividing walls can be plugged together.

10. The apparatus in accordance with claim 6,
wherein the diaphragm structure comprises at least one connection member onto which the spacer insertable between the dividing walls can be threaded or strung.

11. The apparatus in accordance with claim 6,
wherein the dividing walls of the structure are provided with molded spacers by which the dividing walls are held at a defined spacing relative to one another.

12. The apparatus in accordance with claim 1,
wherein the illumination radiation paths are formed by a plurality of elements which are strung with one another which are formed from light conducting and/or light permeable material, which are mechanically fixed to one another and which are optically separated from one another by at least one light impermeable coating.

13. The apparatus in accordance with claim 1,
wherein the radiation sources each comprise at least one light-emitting diode; and/or
wherein one or more mutually parallel strips of a respective plurality of radiation sources following one another in a direction in parallel with the cutting edge or with the cutting plane, with a respective one or more radiation sources or light-emitting diodes being alternately associated with the illumination paths.

14. The apparatus in accordance with claim 1,
wherein the illumination device is configured as a uniform block which is provided with a transparent cover at its end face facing the slicing region.

15. The apparatus in accordance with claim 1,
wherein radiation sources associated with different illumination radiation paths are individually controllable and/or individually variably adjustable.

16. The apparatus in accordance with claim 1,
wherein a light structure can be generated on the product end face to be illuminated by means of the illumination device.

17. The apparatus in accordance with claim 16,
wherein the light structure can be generated at least in part by a corresponding control and/or setting of radiation sources associated with different illumination radiation paths.

18. The apparatus in accordance with claim 16,
wherein the light structure is generated at least in part by a diaphragm and/or by markings which are applied to a transparent cover provided at the end face of the illumination device facing the slicing region or are introduced into such a transparent cover.

19. The apparatus in accordance with claim 1,
wherein at least one illumination radiation path has associated with it a plurality of radiation sources.

20. An apparatus for slicing food products,
having a product feed which defines a feed plane and by means of which the products are fed along the feed plane in a feed direction to a cutting plane which is disposed in a slicing region and in which a cutting blade moves, said cutting blade cooperating with a cutting edge to cut off slices from the products;
having a detection device for radiation reflected from the slicing region and having an evaluation device for evaluating the detected radiation; and
having an illumination device for illuminating the slicing region, said illumination device being arranged in a half-space disposed in front of the slicing region and above the feed plane for an at least substantially frontal illumination of a product end face and having a plurality of radiation sources associated with a diaphragm structure having a plurality of light compartments, wherein each light compartment defines an elongate illumination radiation path, which is optically separate from the elongate illumination radiation paths defined by the other light compartments, and which extends in the direction of the slicing region, wherein the elongate illumination radiation paths are arranged adjacent to one another.

21. An apparatus for slicing food products,
having a product feed which defines a feed plane and by means of which the products are fed along the feed plane in a feed direction to a cutting plane which is disposed in a slicing region and in which a cutting blade moves, said cutting blade cooperating with a cutting edge to cut off slices from the products;
having a detection device for radiation reflected from the slicing region and having an evaluation device for evaluating the detected radiation; and
having an illumination device for illuminating the slicing region, said illumination device being arranged in a half-space disposed in front of the slicing region and above the feed plane for an at least substantially frontal illumination of a product end face and having a radiation source and an associated diaphragm structure which defines a plurality of elongate illumination radiation paths which are optically separate from one another, which each extend in the direction of the slicing region and which are arranged adjacent to one another.

* * * * *